Nov. 13, 1956  D. W. HAMM  2,770,512
UNIT PISTON RING
Filed Jan. 21, 1955  5 Sheets-Sheet 1
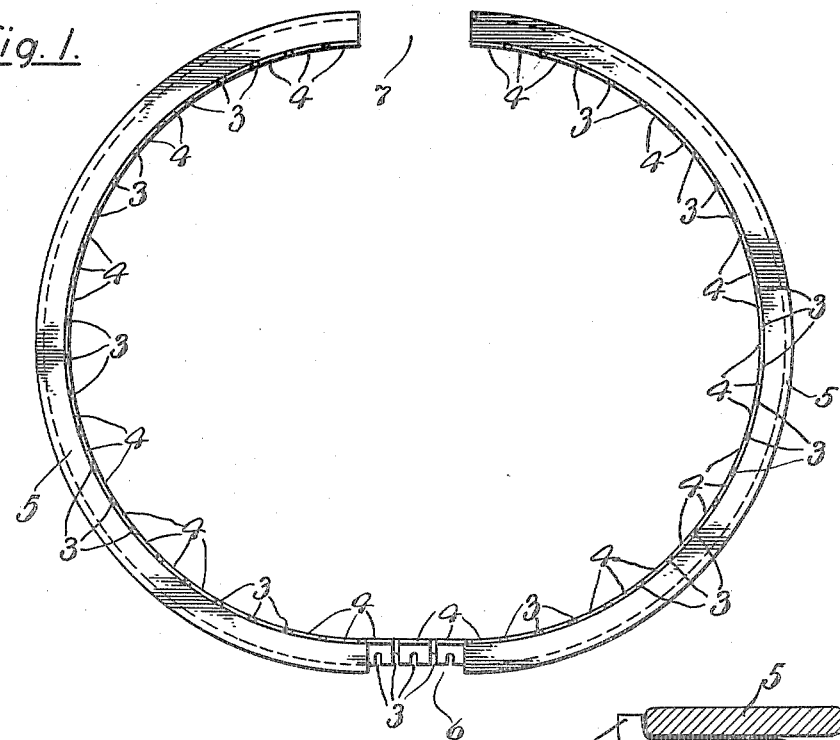
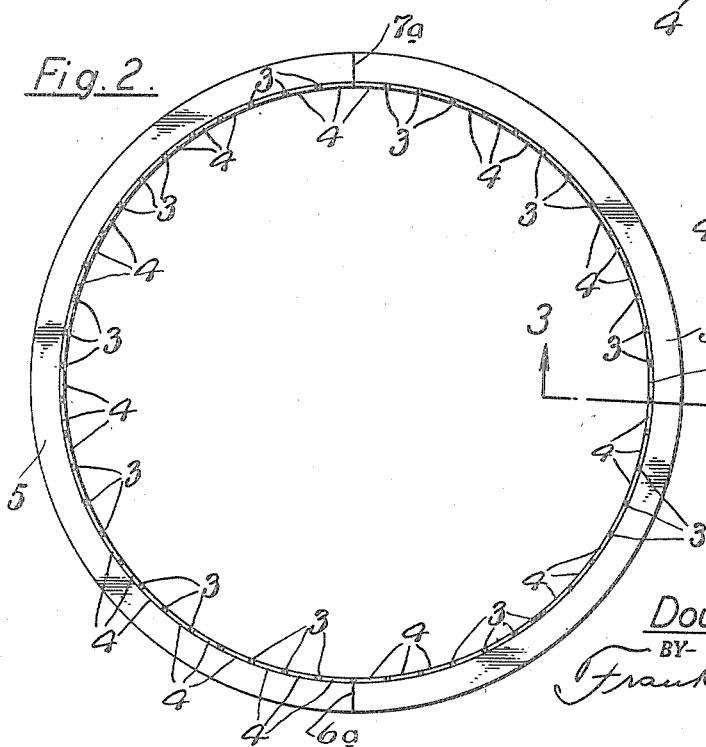
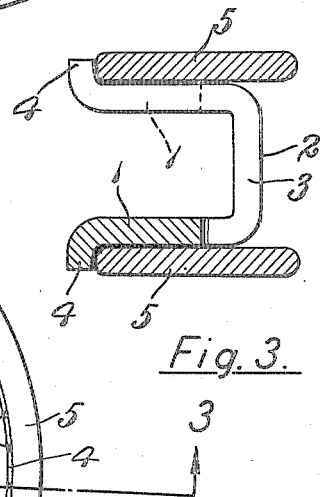
INVENTOR.
Douglas W. Hamm
BY
Frank E. Liverance, Jr.
Attorney Nov. 13, 1956  D. W. HAMM  2,770,512
UNIT PISTON RING
Filed Jan. 21, 1955  5 Sheets-Sheet 2
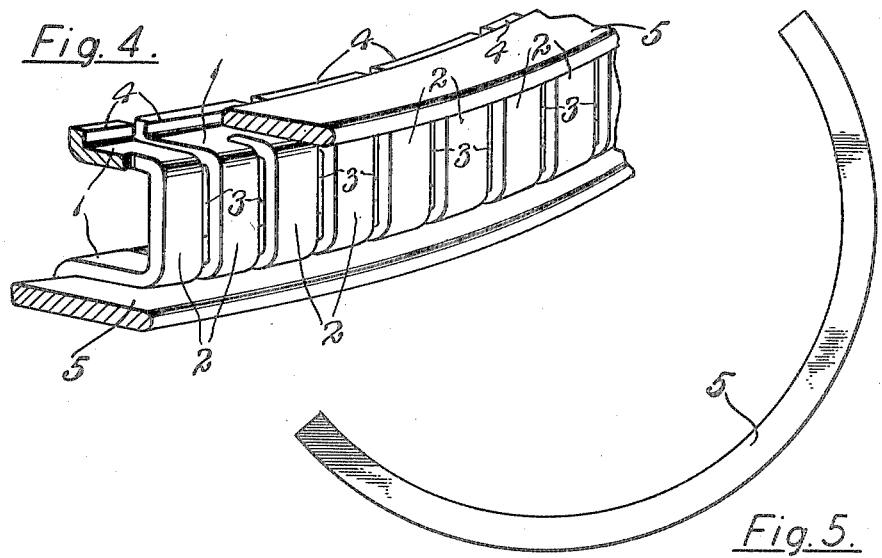
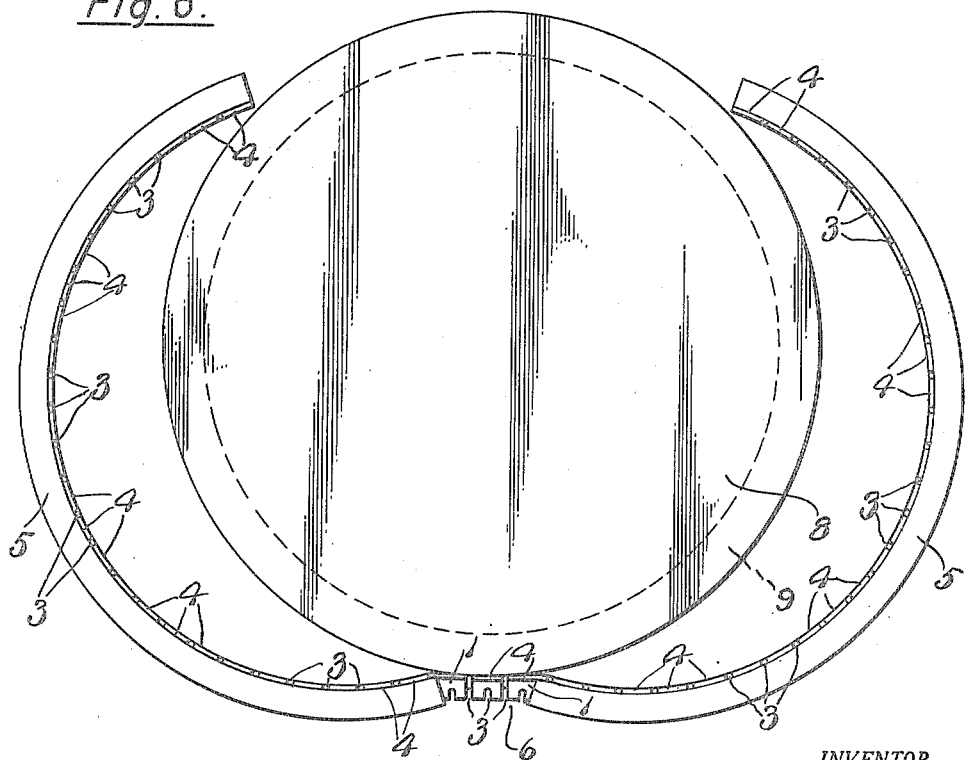
INVENTOR.
Douglas W. Hamm
BY Frank E. Liverance, Jr.
Attorney

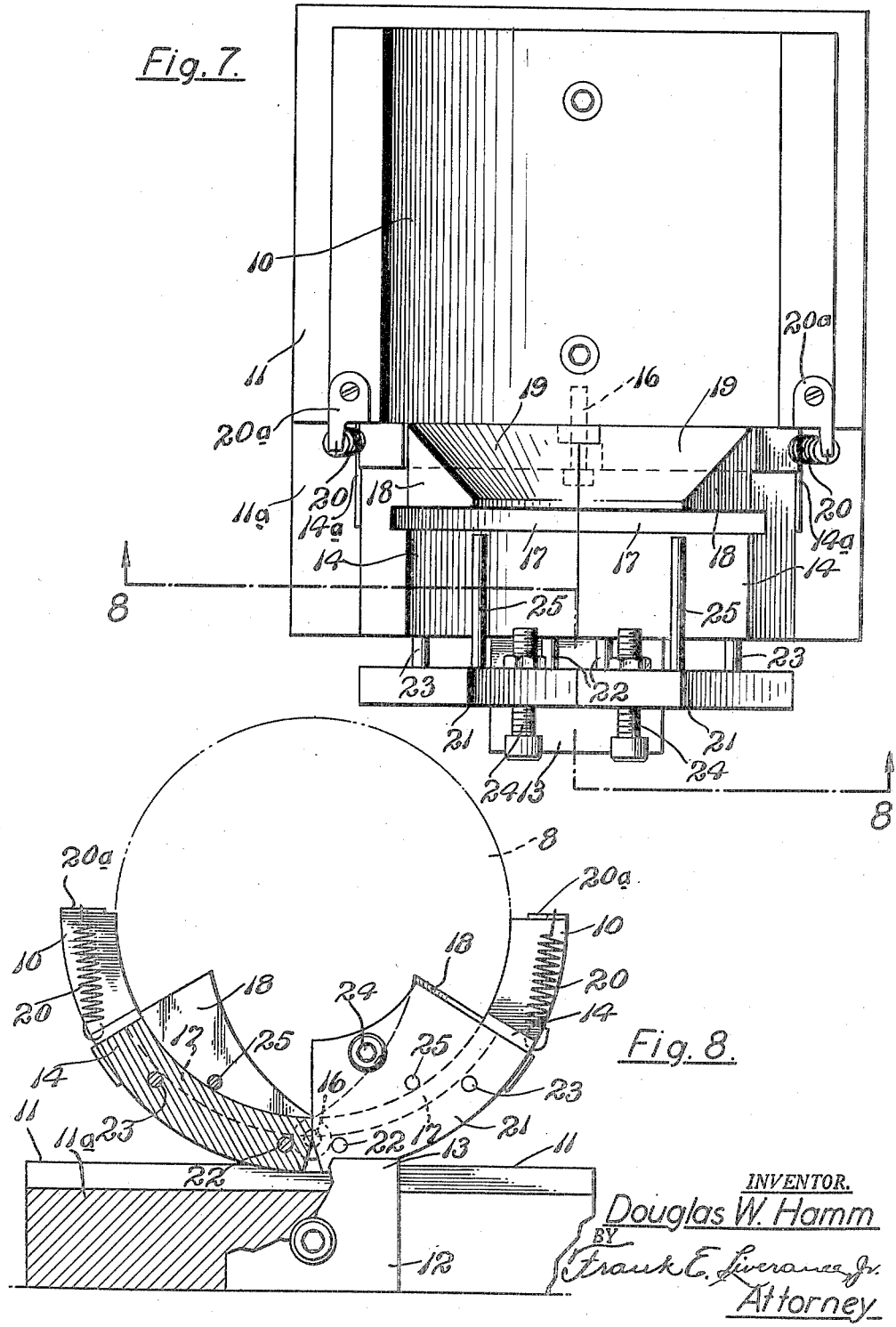

INVENTOR.
Douglas W. Hamm
Frank E. Liverance Jr.
Attorney

INVENTOR.
Douglas W. Hamm

United States Patent Office 2,770,512
Patented Nov. 13, 1956

2,770,512

UNIT PISTON RING

Douglas W. Hamm, Muskegon, Mich., assignor to Muskegon Piston Ring Company, Muskegon, Mich., a corporation of Michigan Application January 21, 1955, Serial No. 483,321

6 Claims. (Cl. 309—44)

The present invention relates to a novel piston ring which, primarily, is for facilitating the installation of the ring structure in the oil ring groove of a piston of an internal combustion engine.

It has long been known that for oil salvaging rings which are in the lower groove of pistons, a piston ring having two spaced apart, thin, parted, generally flat, circular rails held apart and spaced by a parted, circular, vented, spacing ring between them and forced outwardly by use of a corrugated thin spring parted expander located at the inner portions or bottom portions of a piston ring was among the best types of oil salvaging rings. However, the time and expense of installation has been substantially prohibitive for use of such oil salvaging rings in original automotive engine production. Such rings have been used extensively for many years in the replacement of piston rings in automotive internal combustion engines, the time for installation of the rings on the pistons of a single engine at a garage or the like not being of importance, as it is where many thousands of internal combustion engines are made as rapidly and expeditiously as possible.

The beginning of use of the spacer rail type of piston rings for original production in the automobile factories followed the development of so-called "unitized" piston rings, wherein the rails were cemented or glued to the upper and lower sides of the spacer, thus the rails and spacers provided ring units which were as readily installed in original production as the previously used single part piston rings. Such glue or cement used became softened and dissolved very shortly after a new engine was put in operation, releasing the spacer and rails so that they became independently movable with respect to each other.

The unitized, spaced-rail, piston ring was readily produced and installed where both the spacer and the rails parted at one side were of the same initial diameter and had the same radius of curvature so that in opening the unitized ring at the parting it was readily passed over a piston until it reached the lower oil groove in a piston.

Recently, however, the spacer and the expander back of it have been replaced by a single element, a spacer-expander which, while parted at one side for opening in installation on a piston within an engine cylinder is circumferentially compressed, its ends at the parting abutting against each other and the circumference of the spacer-expander being reduced through substantially uniform circumferential compression thereof.

Attempts to cement the parted, flat, thin rails to such circumferentially compressible spacer-expander have been unsuccessful as the rails have a radius less than the normal radius of the spacer-expander. Also in such construction of ring the rails have a greater radial width than has heretofore been used, so that upon opening the spacer-expander and said rails at their partings to pass over the head of a piston, the rails buckle and separate from the expander, and great difficulty is experienced getting the spacer-expander and the buckled rails into the piston ring oil groove, the axial width of which is but slightly more than the combined axial width of the spacer and the rails used with it. Thus, in the original production of internal combustion engines used in automobiles the piston ring installation problems have been increased, the spacer and the two rails being installed independently and each rail buckling when it is opened at its parting so that for original production in factories of the motor vehicle engines, the cost of installation is increased to such an extent that the combined circumferentially compressible spacer-expander used with parted thin rails faces abandonment.

With my invention a novel structure of piston ring for use primarily in the lower oil grooves of pistons has been produced, whereby a spacer-expander of the circumferentially compressible type and sections of rails are glued or cemented together, or "unitized," so as to permit ready and easy installation over the piston. When after installation in the lower oil groove of a piston, the assembly is completed by inserting the piston into a cylinder bore with such "unitized" piston ring, the sections of the rails which are separated at their ends are broken loose from the circumferentially compressible spacer-expander and the ends of the segments brought substantially together. The adjacent ends of the segments used at the parting in the expander are in line with the ends of such spacer-expander while around the ring (if two ring segements for each ring are used as preferred), diametrically opposite from the parting, a length of the spacer-expander is exposed which may be readily bent to open the ring at the parting for easy movement of it over the piston to its oil groove. In other words, the uncovered portion of the spacer-expander opposite the parting is flexible enough that such uncovered portion serves as a hinge joint for easily opening the novel piston ring of my invention for installation in a lower oil groove of a piston, there being no strains or stresses to which the rail segments are subjected. Then when a piston with such piston ring is installed within an engine cylinder, the circumferential compression of the spacer-expander will break the bond between the rail sections, and such spacer-expander being circumferentially compressed, it and the rail sections will have a substantially common radius of curvature.

With my invention, while the novel piston ring which I have produced may be much more quickly and readily installed by hand than now done in using two complete rails and a spacer-expander, the novel piston ring construction lends itself to very rapid installation in the oil grooves of pistons, using a novel installing fixture, the speed of installation being greatly increased and the desired circumferentially compressible spacer-expander and steel rails installed at a minimum of time and expense.

An understanding of the invention may be had from the following description taken in connection with the accompanying drawings, in which, Fig. 1 is a plan view of the novel piston ring of my invention in a preferred form shown open at its parting and having the ends of the rail sections separated diametrically opposite the parting.

Fig. 2 is a like view showing the piston ring in the form it occupies when installed on a piston, within an engine cylinder.

Fig. 3 is an enlarged transverse section substantially on the plane of line 3—3 of Fig. 2.

Fig. 4 is a fragmentary enlarged perspective view of a portion of the unitized ring of my invention.

Fig. 5 is a plan of one of the two rail sections used in the preferred form of my invention, at each side of the spacer-expander.

Fig. 6 is an end elevation of a piston with the piston ring of my invention opened to pass over the head thereof.

Fig. 7 is a plan view of an installing fixture which I have provided for rapid installation of the piston rings of my invention on a piston.

Fig. 8 is a transverse section and elevation, the view being taken looking in the direction of the arrows upon the broken line 8—8 of Fig. 7.

Like reference characters refer to like parts in the different figures of the drawings.

Figure 9:
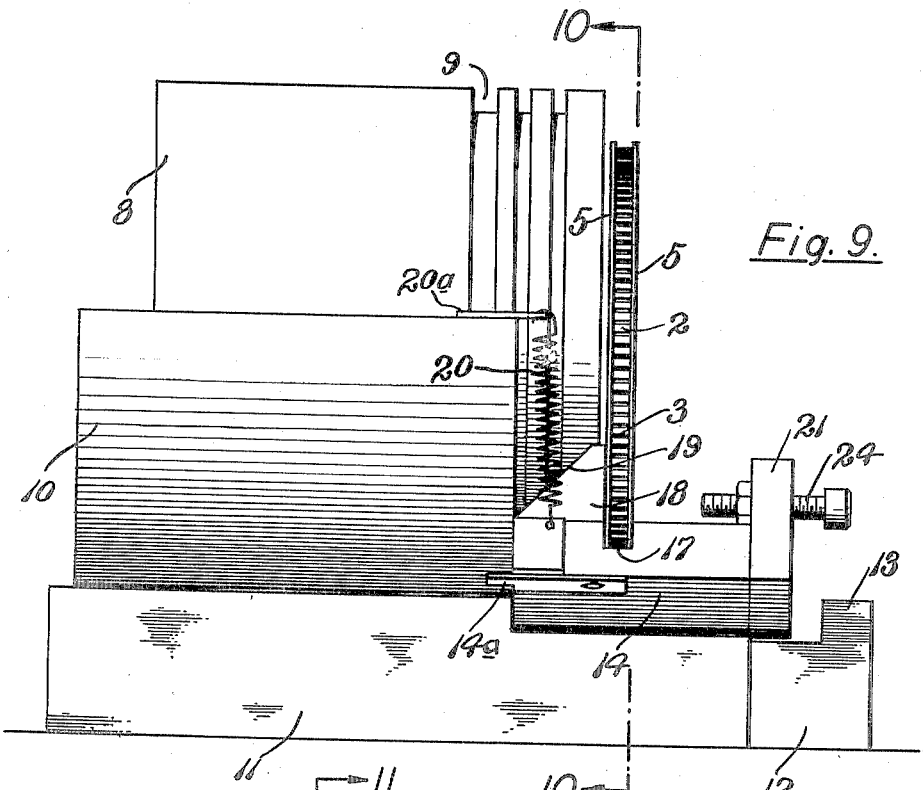
Fig. 9 is a side elevation of the installing fixture shown in Fig. 7 with a piston and a piston ring located therein immediately after the first installation has started.

In the structure of the piston ring of my invention, a circumferentially compressible spacer-expander is used which comprises a plurality of upper and lower generally parallel horizontal segments 1 which at their outer ends are connected by vertical webs 2. The webs and segments are separated from each other by slots 3. Each of the segments 1 at its inner edge has an integral lip 4 extending upwardly from the upper segments and downwardly from the lower segments. The slots 3, alternately at opposite upper and lower sides of the spacer-expander, extend through the lips 4, separate the segments 1 and the webs 2, and reach partially into the segments 1 alternately at opposite upper and lower sides as shown, providing a spacer-expander at the upper and lower sides of which rail sections 5 may be located which at their inner edges come against the lips 4 (Fig. 3). Such lips 4, preferably, at their outer sides have an inward inclination at an angle to the vertical as indicated in Fig. 3.

The rail sections 5 of thin metal are preferably two in number, though not restricted to such number. At their outer edges they extend beyond the webs 2 of the spacer-expander. They are placed upon the outer sides of the segments 1 and adjacent horizontal portions and secured in place by a suitable cement or glue. The ends of the rail sections 5 are separated by a space or gap 6 on the portion of the spacer-expander which is diametrically opposite its parting 7. The other ends of the rail sections 5 reach to and are flush with the ends of the spacer-expander at said parting (Fig. 1).

A piston ring as thus constructed and as shown in Fig. 1, when closed at the parting 7 and upon circumferentially compressing the spacer-expander so that it is of a lesser circumference than its normal circumference, takes the form shown in Fig. 2. The ends of the rail sections 5 at the parting coming substantially together as at 7a, such sections 5 have their glued or cemented connections to the spacer-expander broken and the ends at the gaps 6 are brought substantially together as at 6a in Fig. 2. The circumference of the completed spacer-expander is substantially the same as of the rail produced by the two sections 5, the outer edges of which when installed in an internal combustion engine cylinder being forced with a desired unit pressure against the cylinder walls due to forces generated in the spacer-expander on its being circumferentially compressed to a smaller diameter. The inclinations of the outer sides of the lips 4 tend to force the rails 5 against the sides of a piston ring groove in which installed.

The piston ring of my invention as thus constructed is readily opened at its parting 7 so that it may be passed over the upper end or head of a piston, as at 8 in Fig. 6, and moved to the oil groove 9 of the piston which is the lowermost groove therein. The portion of the spacer-expander at the gap 6 between the ends of the rail sections 5 is flexible and bendable whereby the opposite halves of the piston ring, one at each side of such gap may be moved outwardly as in Fig. 6 and the ring pass over the piston.

Such installation of the piston ring upon a piston may be made by hand. Hand installation is not preferred as there is a liability that the ring will be opened too far and beyond what is needed which would bend the section of the spacer-expander at the gap 6 so as to exceed the elastic limit of the metal of which the spacer-expander is made. Preferably the ring will be installed by means of a novel installing and assembling fixture which not only insures against damage to a piston ring through such exceeding of the elastic limit at the gap 6, but also with which the installation of the rings on pistons is much more expeditiously performed.

In Figs. 7 to 12 inclusive the fixture and method of its use for installation of a piston is shown. In the structure thereof a fixed, generally horizontal semi-cylindrical holder 10 is provided connected to and at the upper side of a horizontal base 11. Such base at its outer or front end has a block 12 fastened thereto which is provided with an upwardly extending stop 13. The outer or forward portion of the base 11 and the upper side of the block 12 inwardly of the stop 13 are below the upper side of the major portion of the block 11, such base being reduced in thickness at its forward portion as at 11a.

The holder 10 for the piston 8 at its front end reaches to the shoulder between the rear thicker portion of the block 11 and its thinner front portion 11a. Two curved wings 14 are located at the front end and lower portion of the piston holder 10 and are provided with overlapping ears 15 at their rear ends and adjacent edges through which pivot screw 16 extends into the front end of the piston holder 10. The wings 14 have the same curvature as the piston holder 10 but extend only part way toward the upper edges of the sides of such piston holder. The wings at their upper side at a distance in front of the front end of the holder 10 are each formed with a ring receiving groove 17, the two grooves being in alignment and in the same plane (Fig. 7). Back of such groove are cam members 18 integral with or permanently secured in place on the wings 14. The rear sides of the cam members 18 have inclined cam surfaces 19 making a portion of a generally frustro-conical surface as shown in Fig. 7. The wings are normally held in upper position by coiled tension springs 20 extending from their points of connection to the wings upwardly to fingers 20a connected at the front end and upper edge of each of the sides of the piston holder 10.

In front of the wings 14 and between them and the stop 13 two vertical members 21 are located which, by means of rods 22 and 23, are slidably mounted on the wings 14 and also move with such wings in their movements about the axis of the pivot 16. The rods 22 and 23 connected to the members 21 extend rearwardly therefrom into openings in the wings for receiving the rods, such rods having slidable movement for a short distance, outwardly until they come against the stop 13 and inwardly until they come against the front or outer ends of the wings 14. Each of the members 21 toward its upper edge is provided with a horizontal screw 24 passing therethrough, adjustable to different positions and having lock nut means for securing them in any position to which adjusted. Each of the members 21 also carries a rearwardly extending horizontal rod 25 which in the outer position of the members 21 (Fig. 7) at their rear ends are a short distance in front of the ring grooves 17 while, when the members 21 are at their rear positions against the front ends of the wings 14, the rear portions of the rods 25 pass over the grooves 17.

Figure 10:
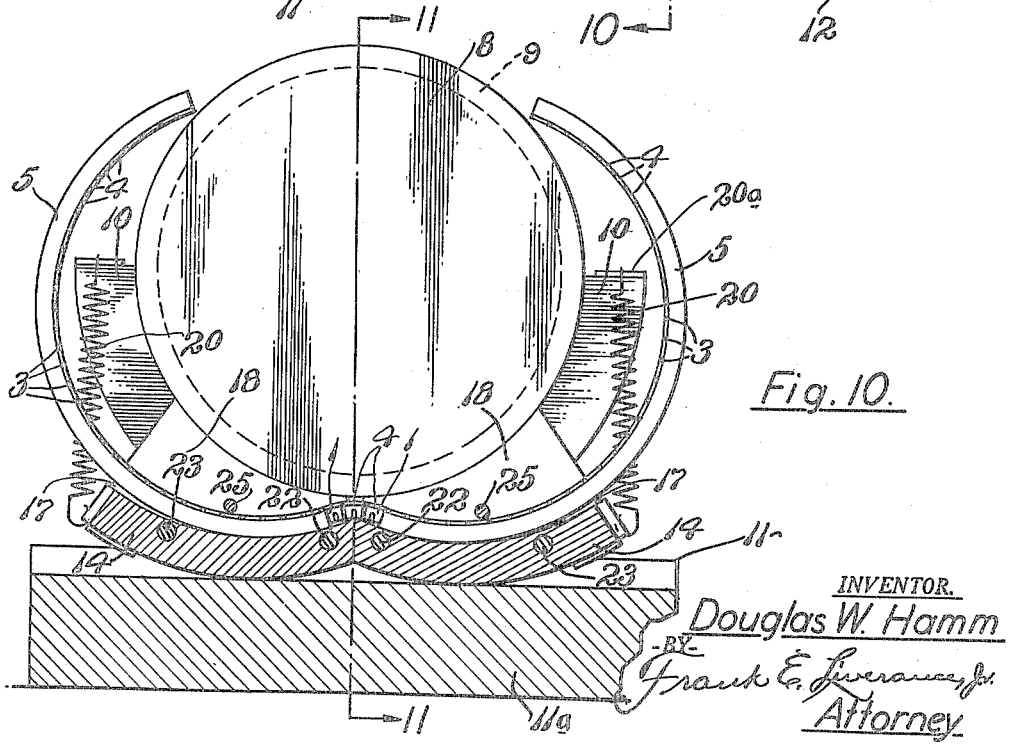
Fig. 10 is a transverse section and end elevation substantially on the plane of line 10—10 of Fig. 9 looking in the direction indicated.
Figure 11:
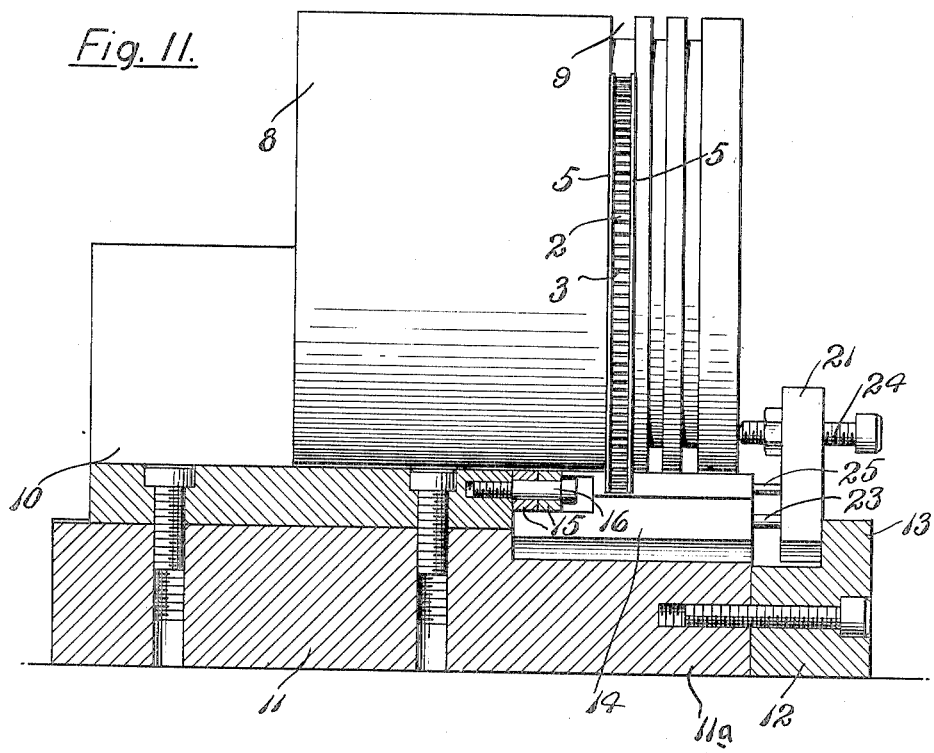
Fig. 11 is a longitudinal section on the plane of line 11—11 of Fig. 10, the piston and piston ring being shown in side elevation at the conclusion of the movement of the piston.
Figure 12:
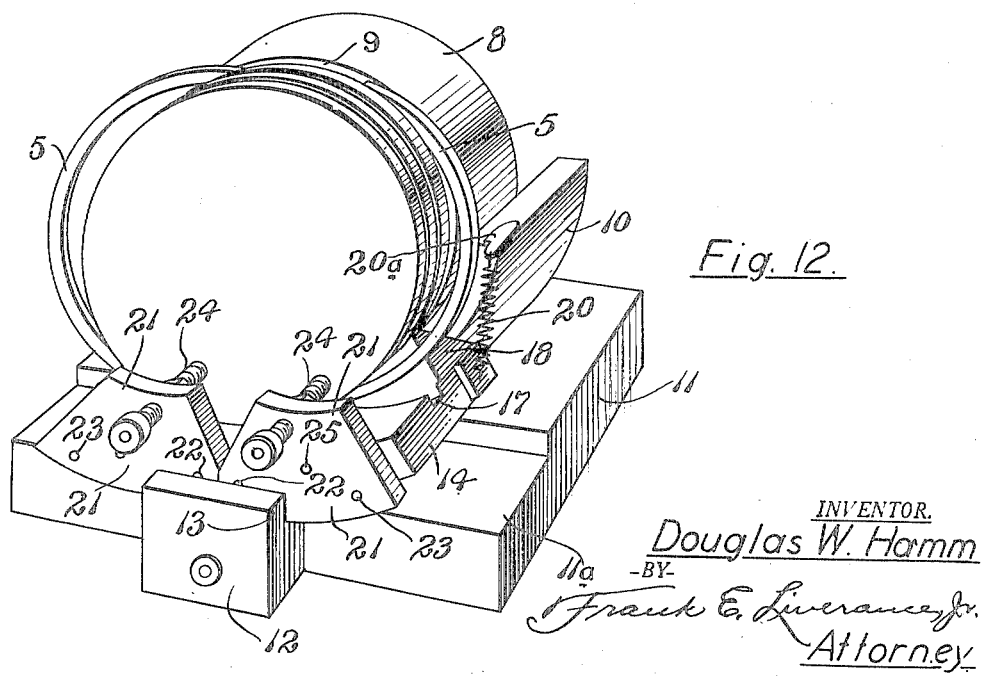
Fig. 12 is a perspective view of such fixture with the parts located as in Fig. 11.

In the operation of installing the piston ring of my invention upon a piston the piston 8 is placed in the holder 10, as in Fig. 9, and a piston ring is placed in the grooves 17 with the members 21 at front position against the stop 13. When the piston ring has been put in place, members 21 and rods 25 are moved rearwardly, the rear end portions of rods 25 passing over the piston ring. By grasping the piston 8 and moving it in a forward direction, that is, to the right in Fig. 9, the head of the piston rides upon the cams 19 thereupon automatically moving the wings downwardly against the springs 20 as in Fig. 10. The rods 25, with the members 21, in the positions in Figs. 9 and 10, are located over the piston ring at opposite sides of the flexible hinge section thereof at the gap 6 between the ends of the rail sections 5. When the wings are swung downwardly to the position shown in Fig. 9 the pins 25 open the ring (Fig. 10) so that the piston may be moved over the central portion of the opened ring, pins 25 holding the ring against moving or springing upwardly into the outer ring grooves of the piston. When the outer end of the piston comes to the screws 24 and engages therewith a further movement of the piston lengthwise causes the members 21 to be moved until they come against the stop 13. With such movement rods 25 are carried outwardly until their inner or free ends are in front of the grooves 17 (Fig. 7) whereupon the piston ring having been released by the rods 25 enters the lowermost oil groove 9 of the piston (Figs. 11 and 12). The piston 8 and the piston ring in the groove 9 are then lifted from the fixture with such fixture conditioned for a repetition of the cycle of installing a piston ring of my invention upon a piston.

The steps of installation therefore are first, with the members at 21 at their outer positions as in Figs. 11 and 12, to place a piston ring in the groove 17 and a piston in the holder 10. The second step is to move the members 21 and the ring holding rods 25 rearwardly from the position shown in Figs. 7 and 11 to that shown in Figs. 9 and 10. The next step is to move the piston bodily lengthwise of the holder 10 until its outer end comes against the screws 24, continuing the movement until the members 21 are stopped by the stop 13. The piston ring is at and at least partly in the groove 9, the final step being a removal of the piston with its ring installed in the groove 9.

The invention described and the method of installation which has been outlined solve the problems of installation of multipiece oil piston rings which, desirably, have a circumferentially compressible spacer-expander and spaced cylinder wall engaging thin rails held by such spacer against opposite sides of the piston ring groove and forced outwardly by the resistance of the spacer-expander to circumferential compression. The piston rings as described are readily manufactured and quickly and easily installed, greatly reducing installation expense and insuring that when they are installed they are not damaged or strained beyond elastic limits at any places. The invention, restricted to the piston ring structure, is defined in the appended claims, the installation fixture as to its patentable novelty to be the subject matter of a separate application.

I claim:

1. A piston ring comprising, a circumferentially compressible, flexible, circular spacer having a parting at one side thereof, horizontal spaced connected segments, and lips at the inner edges of said segments extending away therefrom at an angle to the horizontal, and a plurality of thin, arcuate rail sections releasably secured to said segments around said spacer at the outer sides thereof having inner edges substantially against said lips, the ends of the rail sections at said parting being aligned with the ends of said spacer at the parting, and adjacent ends of ring sections opposite said parting being spaced from each other, the radius of curvature of said spacer being greater than the radius of curvature of said ring sections in normal uncompressed condition, and substantially equal therewith in circumferentially compressed condition.

2. A piston ring comprising, a parted, flexible, circumferentially compressible, circular spacer, arcuate rail sections cementitiously secured to opposite sides of and in generally circular alignment around the spacer, said sections at the ends thereof at the parting in said spacer aligning with the ends of the spacer at said parting, and said sections opposite said parting being spaced from each other at adjacent ends, a portion of said spacer being uncovered, and means on the spacer engaging said rail sections at their inner edges, said spacer when circumferentially compressed breaking loose from said rail sections whereby said parting is closed and the adjacent ends of rail sections located substantially against each other.

3. A piston ring comprising, a parted, flexible, circumferentially compressible, circular spacer, two semi-circular rail sections releasably cementitiously secured to each of the opposed sides of said spacer, means on the spacer against which the inner edges of the rail sections are adapted to bear, the adjacent ends of rail sections at said parting being in substantial alignment with the ends of said spacer at its parting, and the other ends of the rail sections being separated a distance such that when the spacer is closed at its parting and circumferentially compressed, the rail sections are released from the spacer and at adjacent ends are brought into substantially abutting relation.

4. A piston ring comprising, a parted, flexible, circumferentially, compressible circular spacer, two semi-circular, thin flat rail sections located against each of the opposed sides of said spacer, means on the spacer against which the inner edges of the rail sections are adapted to bear, means maintaining the ends of rail sections at said parting in substantial alignment with the ends of the spacer at the parting therein, and the other ends of the rail sections separated a distance such that when the spacer is closed at its parting and circumferentially compressed, the rail sections, at adjacent ends thereof, are brought into substantially abutting relation.

5. A piston ring comprising, a flexible, circular spacer, parted at one side, having a preselected radius and circumferentially compressible with its parting closed to a lesser preselected radius, semi-circular thin rail sections, each having a radius of curvature substantially identical with said lesser radius of said compressed spacer, two of said rail sections being located at each of opposed sides of the spacer, and normally separated at the ends thereof at said parting and diametrically opposite said parting and means on said spacer against which the inner edges of said rail sections engage on circumferentially compressing said spacer.

6. Structure as defined in claim 5, and frangible cementing means securing the rail sections to said spacer, with adjacent ends of said rail sections spaced from each other generally opposite the parting in the spacer.

References Cited in the file of this patent

UNITED STATES PATENTS

| 1,831,574 | Norton | Nov. 10, 1931 |
| 2,140,710 | Meisel | Dec. 20, 1938 |
| 2,620,245 | Moore et al. | Dec. 2, 1952 |
| 2,635,022 | Shirk | Apr. 14, 1953 |
| 2,695,825 | Estey | Nov. 30, 1954 |

FOREIGN PATENTS

| 123,352 | Great Britain | Feb. 27, 1919 |